(12) United States Patent
Gazda et al.

(10) Patent No.: US 7,645,993 B2
(45) Date of Patent: Jan. 12, 2010

(54) ARRAYED NEUTRON DETECTOR WITH MULTI SHIELDING ALLOWING FOR DISCRIMINATION BETWEEN RADIATION TYPES

(75) Inventors: Jerzy Gazda, Austin, TX (US); Tim Z. Hossain, Austin, TX (US)

(73) Assignee: Spansion, LLC, Sunnyvale, CA (US)

( * ) Notice: Subject to any disclaimer, the term of this patent is extended or adjusted under 35 U.S.C. 154(b) by 0 days.

(21) Appl. No.: 11/966,672

(22) Filed: Dec. 28, 2007

(65) Prior Publication Data

US 2009/0166550 A1 Jul. 2, 2009

(51) Int. Cl.
*G01T 3/00* (2006.01)
(52) U.S. Cl. ................... 250/370.05; 257/252
(58) Field of Classification Search ............ 250/370.05; 257/252

See application file for complete search history.

(56) References Cited

U.S. PATENT DOCUMENTS

| | | | | |
|---|---|---|---|---|
| 3,873,840 | A * | 3/1975 | Ellis ............................ | 250/392 |
| 5,083,028 | A * | 1/1992 | Decossas et al. ........ | 250/390.03 |
| 5,930,167 | A * | 7/1999 | Lee et al. ................. | 365/185.03 |
| 6,075,261 | A * | 6/2000 | Hossain et al. ............... | 257/252 |
| 6,259,099 | B1 * | 7/2001 | Foulon et al. ........... | 250/370.14 |
| 6,348,356 | B1 * | 2/2002 | Shabde et al. .................. | 438/14 |
| 6,373,066 | B1 * | 4/2002 | Penn ....................... | 250/390.11 |
| 7,161,206 | B2 * | 1/2007 | Oh et al. ...................... | 257/316 |
| 7,271,389 | B2 * | 9/2007 | August et al. ........... | 250/370.05 |
| 7,307,878 | B1 * | 12/2007 | Lee et al. ................. | 365/185.03 |
| 7,391,071 | B2 * | 6/2008 | Park et al. ..................... | 257/296 |
| 7,402,493 | B2 * | 7/2008 | Oh et al. ...................... | 438/257 |
| 7,405,977 | B2 * | 7/2008 | Lee et al. ................. | 365/185.23 |
| 2004/0084626 | A1 * | 5/2004 | McGregor ............. | 250/370.05 |
| 2004/0119591 | A1 | 6/2004 | Peeters | |
| 2004/0227094 | A1 * | 11/2004 | Tompa et al. .......... | 250/370.01 |
| 2005/0017158 | A1 * | 1/2005 | Kojima ................... | 250/231.13 |
| 2005/0017185 | A1 * | 1/2005 | King ...................... | 250/370.05 |
| 2006/0216841 | A1 * | 9/2006 | Murin et al. ................... | 438/17 |
| 2008/0046641 | A1 * | 2/2008 | Lasser ........................ | 711/103 |
| 2008/0123413 | A1 * | 5/2008 | Maayan et al. ......... | 365/185.03 |

FOREIGN PATENT DOCUMENTS

EP  1 081 509  3/2001

OTHER PUBLICATIONS

International Search Report and Written Opinion corresponding to U.S. Appl. No. 11/966,672 mailed on Sep. 28, 2009.

* cited by examiner

*Primary Examiner*—David P Porta
*Assistant Examiner*—Djura Malevic
(74) *Attorney, Agent, or Firm*—Turocy & Watson, LLP

(57) ABSTRACT

Neutron detectors including one or more gamma shields over memory dies and methods of making the neutron detectors are provided. The neutron detectors can contain two or more memory dies, neutron-reactant layers over the two or more memory dies, and one or more gamma shields over at least a portion of or an entire of the two or more memory dies. By containing the gamma shield over the at least a portion of or an entire of the two or more memory dies, the neutron detector can detect and discriminate neutrons in the presence of gamma rays.

20 Claims, 13 Drawing Sheets

ARRAYED NEUTRON DETECTOR WITH MULTI SHIELDING ALLOWING FOR DISCRIMINATION BETWEEN RADIATION TYPES

TECHNICAL FIELD

Described are neutron detectors with multi shielding allowing for discrimination between radiation types and methods of forming the neutron detectors.

BACKGROUND

Conventional neutron detectors generally include a sealed vessel containing a neutron sensitive gas, such as $^3$He or $BF_3$, and an electrically charged wire having leads which extend outside of the vessel. In operation, incident neutrons react with the gas and produce charged particles. The charged particles change the electrical potential of the wire. A measurement system coupled to the charged wire measures the electrical pulses and uses this information to indicate the presence of neutrons. These types of neutrons detectors are usually undesirably bulky and are associated with poor sensitivity resulting from, for example, electronic noise.

Attempts have been made to produce more portable neutron detectors using semiconductors. For example, $^3$He is diffused into a semiconductor substrate and used in the detection of neutrons. Neutrons react with the $^3$He gas and produces hole-electron pairs in a depletion layer within the semiconductor. The hole-electron pairs produce output electrical pulses which appear at the output terminals of the detector. The electrical pulses are utilized for detecting neutrons.

Semiconductor-based radiation detectors generally have a single-crystal substrate with a p-n junction or a Schottky junction. An inverse bias is applied to the depletion layer. When radiation in the form of neutrons, gamma-rays, X-rays, electrons, protons, etc. are absorbed by the material, electron-hole pairs are created. These charges give rise to a current that is a measure of the intensity of the radiation flux detected by the detector.

SUMMARY

The following presents a simplified summary of the innovation in order to provide a basic understanding of some aspects of the innovation. This summary is not an extensive overview of the innovation. It is intended to neither identify key or critical elements of the innovation nor delineate the scope of the innovation. Its sole purpose is to present some concepts of the innovation in a simplified form as a prelude to the more detailed description that is presented later.

One aspect of the subject innovation provides neutron detectors. The neutron detectors can discriminate neutrons in the presence of gamma rays. The neutron detectors contain two or more memory dies containing a plurality of memory cells on a semiconductor substrate; neutron-reactant layers over the two or more memory dies; and one or more gamma shields over at least a portion of or an entire of the two or more memory dies. By containing the gamma shield over the memory dies, the neutron detector can detect and discriminate neutrons in the presence of gamma rays.

Another aspect of the subject innovation provides methods of making neutron detectors that can discriminate neutrons in the presence of gamma rays. The methods include forming neutron-reactant layers over two or more memory dies containing a plurality of memory cells and forming one or more gamma shields over at least a portion of or an entire of the two or more memory dies.

Yet another aspect of the subject innovation provides methods of detecting strength of a neutron field. The method includes providing a neutron detector containing two or more memory dies, neutron-reactant layers over the two or more memory dies, and one or more gamma shields over at least a portion of or an entire of the two or more memory dies, the memory die containing a plurality of memory cell; reading a state of each of the memory cells of the memory dies to determine a number of memory cells changing from an initial state to a disturbed state; and determining the strength of the neutron field by using the number of memory cells having the disturbed state.

To the accomplishment of the foregoing and related ends, the innovation, then, comprises the features hereinafter fully described and particularly pointed out in the claims. The following description and the annexed drawings set forth in detail certain illustrative embodiments of the innovation. These embodiments are indicative, however, of but a few of the various ways in which the principles of the innovation may be employed. Other objects, advantages and novel features of the innovation will become apparent from the following detailed description of the innovation when considered in conjunction with the drawings.

DETAILED DESCRIPTION

Figure 1A:
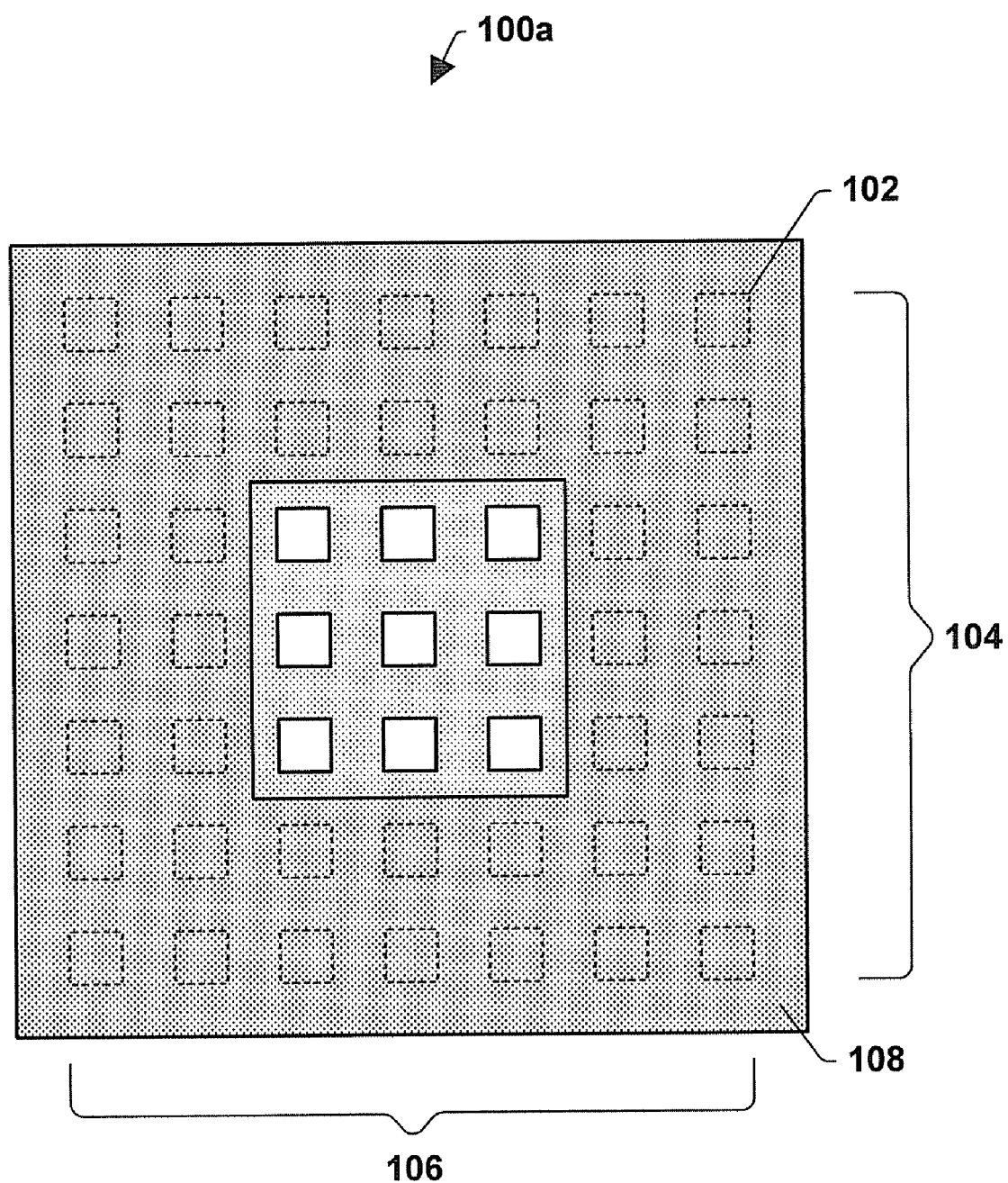
FIGS. 1a-1d are top views of exemplary neutron detectors containing an array of multiple memory dies in accordance with one aspect of the subject innovation.
Figure 1B:
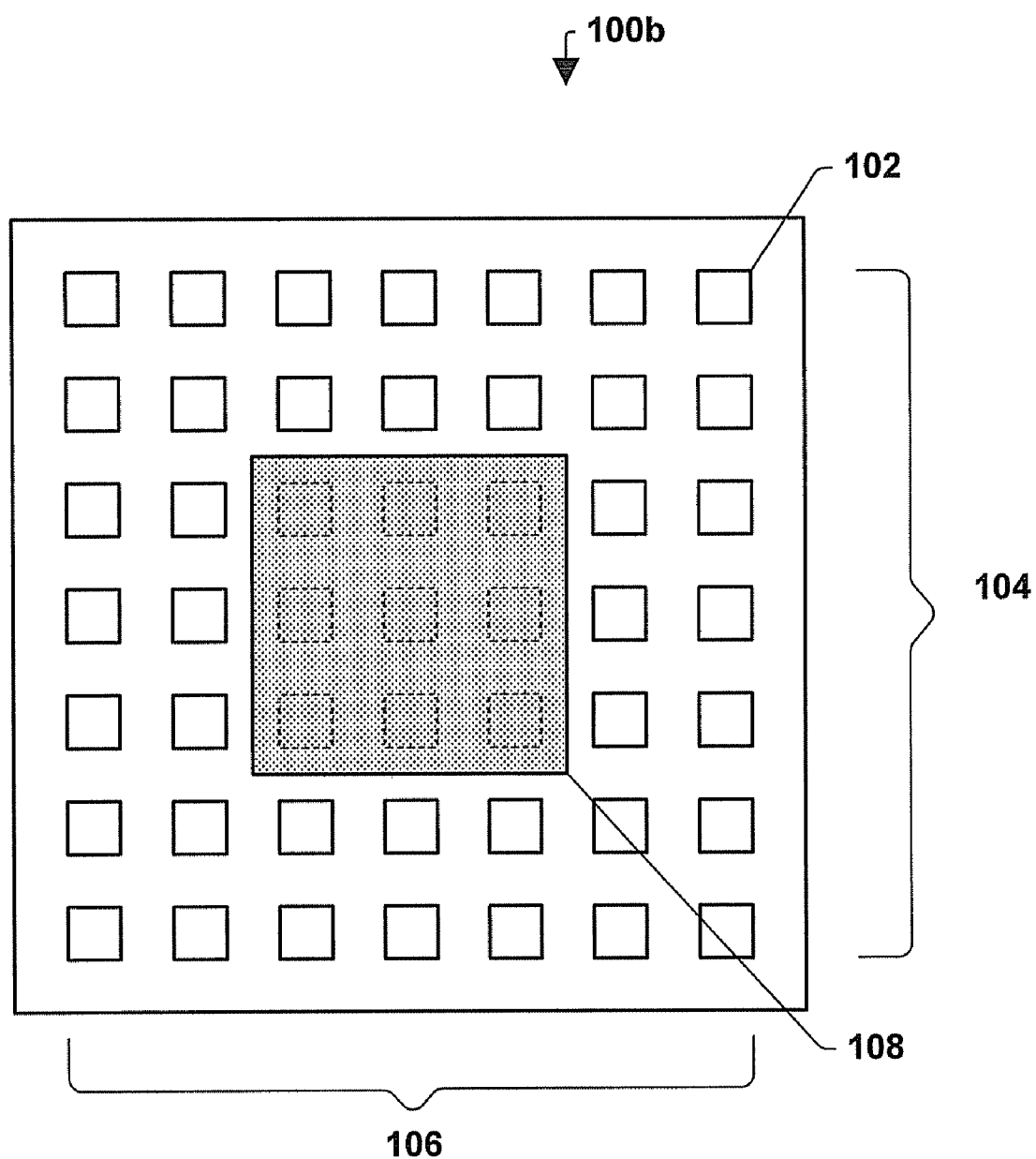
Figure 1C:
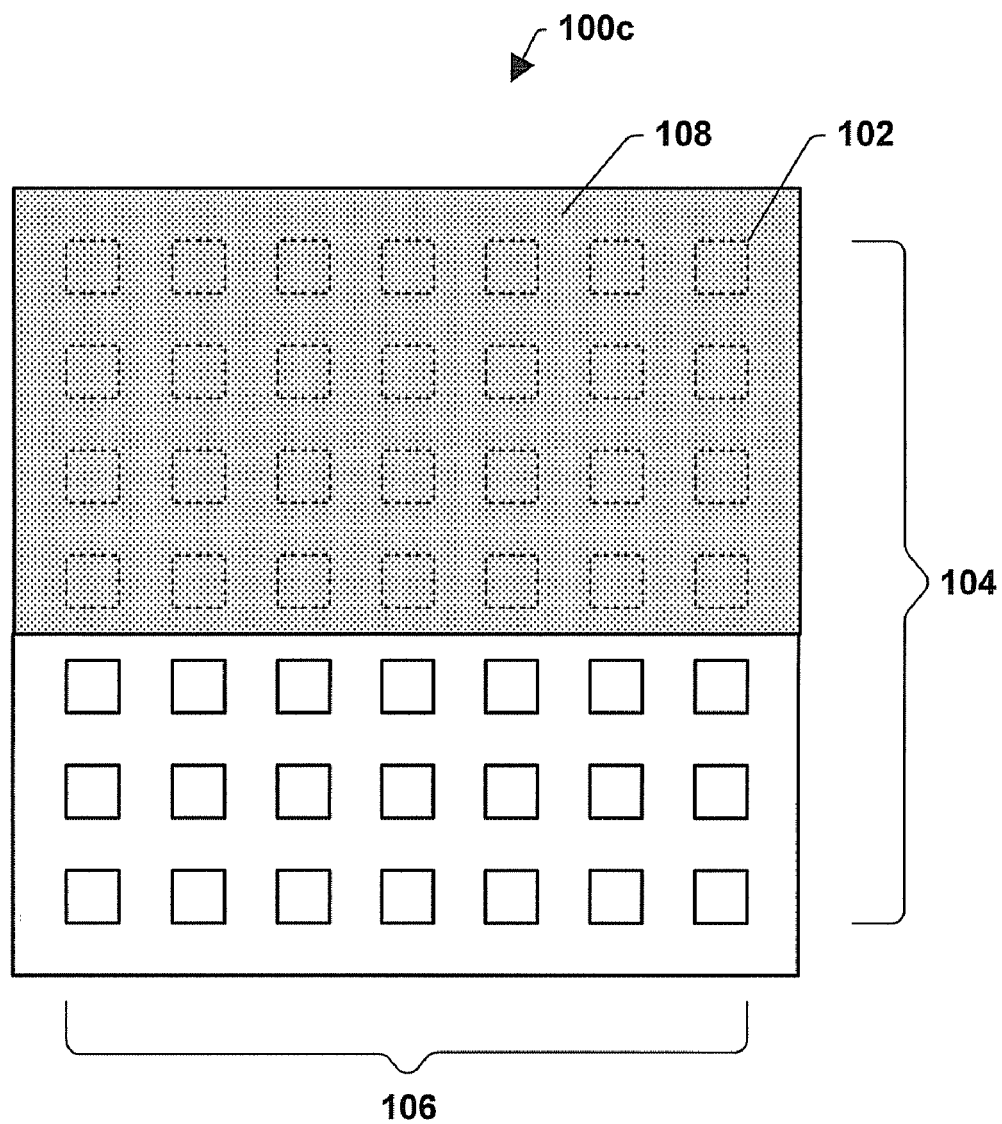
Figure 1D:
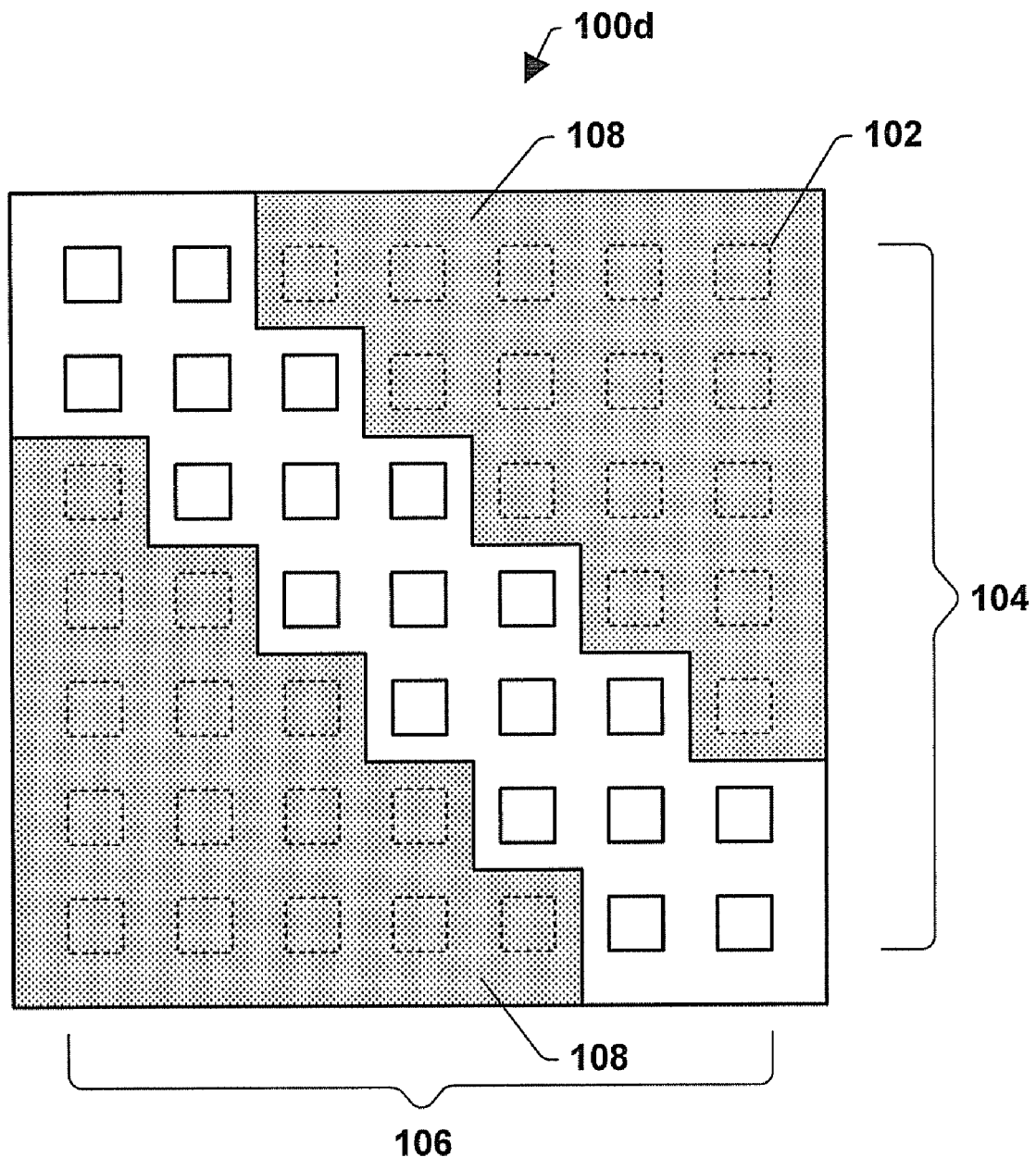

Neutron detectors described herein can contain two or more memory dies, neutron-reactant layers over the two or more memory dies, and one or more gamma shields over at least a portion of or an entire of the two or more memory dies. The neutron detectors can employ semiconductor devices such as memory dies (e.g., flash memories). The memory dies can contain a plurality of memory cells on a semiconductor substrate. Penetration of neutrons and gamma rays into memory cells can change their state such as a logical 1 or 0. The gamma shields can facilitate discrimination between radiation types (e.g., neutron and gamma ray). The gamma shield covers at least a portion of or an entire of an array of multiple memory dies and substantially prevents penetration of gamma rays into the memory dies. As a result, the gamma shield on the memory dies can facilitate to detect and discriminate neutrons in the presence of gamma rays.

Because the neutron detectors contain the gamma shield, neutrons can be detected efficiently. For example, by selectively shielding some of memory dies, flux and energy of incoming radiation at the shielded portion and at the unshielded portion of the memory dies can be compared. The neutron detector can eliminate occurrences when gamma rays are triggering the neutron detector from the events when high-energy particle (e.g., neutrons) causes excitation of the detector. As a result, spurious readings caused by gamma rays can be eliminated, thereby allowing for more efficient neutron detection.

The neutron detector can employ any type of semiconductor device (e.g., memory die) as long as the state of the semiconductor device is changed when particles associated with neutrons penetrate the semiconductor device. An initial undisturbed state (e.g., logical 1) of a semiconductor device can be changed to a disturbed sate (e.g., logical 0) when particles associated with neutrons penetrate the semiconductor device. The neutron detector can employ memory cells such as single-level memory cells, multi-level memory cells, single bit memory cells, dual bit memory cells, quad bit memory cells, or the like as a memory die. The dual bit memory is a relatively modern memory technology and allows multiple bits to be stored in a single memory cell. The dual bit memory cell is essentially split into two identical (mirrored) parts, each of which is formulated for storing one of two independent bits. Each dual bit memory cell, like a traditional cell, has a gate with a source and a drain. However, unlike a traditional stacked gate cell in which the source is always connected to an electrical source and the drain is always connected to an electrical drain, respective dual bit memory cells can have the connections of the source and drain reversed during operation to permit storage of two bits. Other types of memory cells such as dynamic random access memory (DRAM) cells, static random access memory (SRAM) cells, or charge coupled devices (CCD) can be also employed.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Although the neutron detector can employ any type of memory die, the innovation is hereinafter illustrated and described in the context of an exemplary semiconductor device having one or more memory arrays containing single bit memory cells arranged in a virtual ground type array architecture. FIGS. 1a-1d illustrate top views of exemplary neutron detectors containing two or more memory dies. Each memory die can include M by N array cores. In FIG. 1a, a neutron detector 100a contains two or more memory dies (e.g., memory arrangements or memory devices) 102 with a row 104 and a column 106. Each memory die 102 can contain a plurality of memory cells (not shown). The memory cells are formed upon a semiconductor substrate (not shown). The memory dies 102 contain neutron-reactant layers over the plurality of memory cells (not shown). The neutron-reactant layer can react with neutrons and emit one or more particles capable of changing the state of memory cells. For example, when a neutron reacts with the neutron-reactant layer containing $^{10}$Boron, a $^{7}$Lithium particle and a $^{4}$Alpha particles are emitted. Either of these particles can change the state of memory cells.

The neutron detector 100a can further contain one or more shields over a portion of or an entire of the two or more memory dies 102. In FIG. 1a, a gamma shield 108 covers memory dies 102 at a peripheral portion of the neutron detector. A portion of the memory dies indicated by a dashed line illustrates that the portion is under the gamma shield 108. A portion of the plurality of memory dies indicated by a solid line illustrates that the portion is not covered by the gamma shield 108. The gamma shield 108 substantially prevents penetration of gamma rays into the memory dies 102 under the gamma shield. As a result, while the memory dies illustrated by the dashed line under the gamma shield can detect and discriminate neutrons against gamma rays, the memory dies illustrated by the solid line not covered by the gamma shield can detect both neutrons and gamma rays.

Neutron detectors can contain any suitable shape of gamma shields over a portion of or an entire of two or more memory dies. In one embodiment, in FIG. 1b, a gamma shield 108 is formed at a center of an array of multiple memory dies 102. In another embodiment, in FIG. 1c, a gamma shield 108 is formed at one side of an array of multiple memory dies 102. In yet another embodiment, in FIG. 1d, two triangular gamma shields 108 are formed diagonally opposite each other at corners of an array of multiple memory dies 102. In still yet another embodiment, a shape of the gamma shield is a triangle, square, rectangular, circle, oval, or the like (not shown).

One or more gamma shields 108 can be formed over any suitable number of memory dies 102. In one embodiment, one or more gamma shields are formed over about 5% of memory dies or more and about 95% of memory dies or less. In another embodiment, one or more gamma shields are formed over about 10% of memory dies or more and about 90% of memory dies or less. In yet another embodiment, one or more gamma shields are formed over about 20% of memory dies or more and about 80% of memory dies or less.

Figure 2:
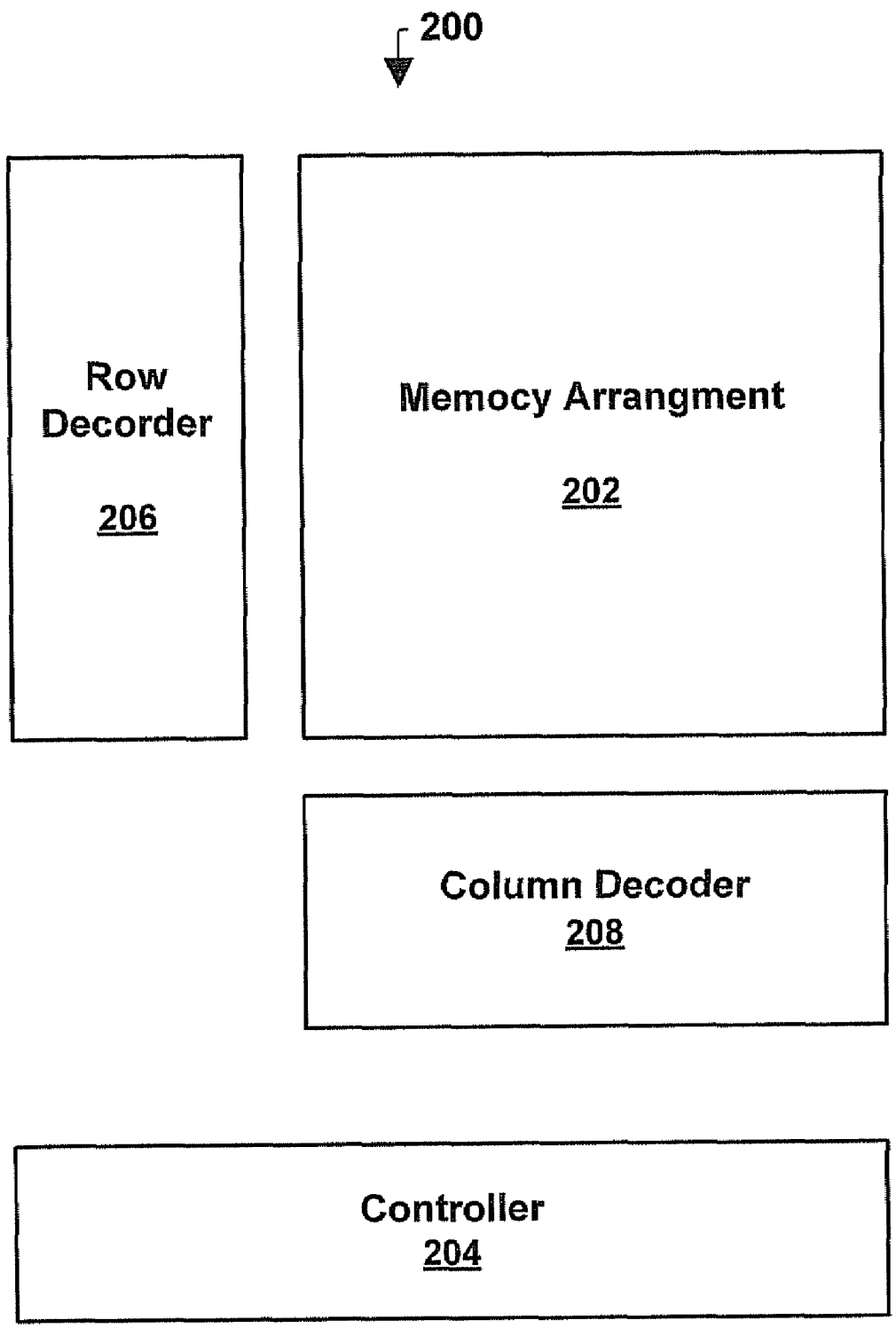
FIG. 2 is a top view of a portion of an exemplary neutron detector in accordance with one aspect of the subject innovation.

FIG. 2 illustrates a top view of an exemplary memory die (e.g., memory device) 200. The memory die 200 generally includes a semiconductor substrate (not shown) on which one or more memory arrangements (e.g., high-density core regions) 202 and coupled to a controller 204.

The memory arrangement 202 typically includes a M by N memory array and a neutron-reactant layer over the memory array. The memory arrangement 202 may include a gamma shield over the memory array, or the memory arrangement 202 may not include a gamma shield. The memory arrangement 202 includes individually addressable, substantially identical memory cells (e.g., single bit memory cells, dual bit memory cells, quad bit memory cells, or the like). The memory arrangement can include any suitable number of memory cells. For example, the memory arrangement includes about 1-megabit memory arrays or more and about 4-megabit memory arrays or less. Each of memory cells can store a state, such as a logical 1 or 0.

Advantageously, the controller 204 can be formed on the same semiconductor substrate as the memory arrangement 202. This can allow for a portable and compact neutron detector. For example, detectors having dimensions of about ¾"× ¾"×¼' is manufactured. The neutron detectors can, for example, be worn on the wrist of a user, similar to a watch. In another embodiment, the controller 204 is formed on a separate semiconductor substrate than the memory arrangement 202.

The controller 204 is generally coupled to the memory arrangement 202 using a row decoder 206 and a column decoder 208. By providing a row address and a column address to the row decoder 206 and the column decoder 208, respectively, the controller 204 is able to read and write the state of each memory cell in the memory arrangement 202.

In general, the controller 204 sets the state of each memory cell in the memory arrangement 202 and periodically reads the state of each memory cell to determine whether the state of the memory cell is changed. For example, the controller 204 sets the state of each memory cell to an initial undisturbed state of logical 1 and read a state of each of the memory cells to determine a number of memory cells changing from an initial undisturbed state to a disturbed state. Using this information, the controller 204 can determine the presence and strength of a neutron field. The details of the controller and the process performed by a controller to detect the presence of neutrons are not critical to the practice of the methods. The details of the process of the controller can be found in, for example, U.S. Pat. No. 6,075,261, entitled "Neutron Detecting Semiconductor Device," issued Jun. 13, 2000, which is hereby incorporated by reference.

Figure 3A:
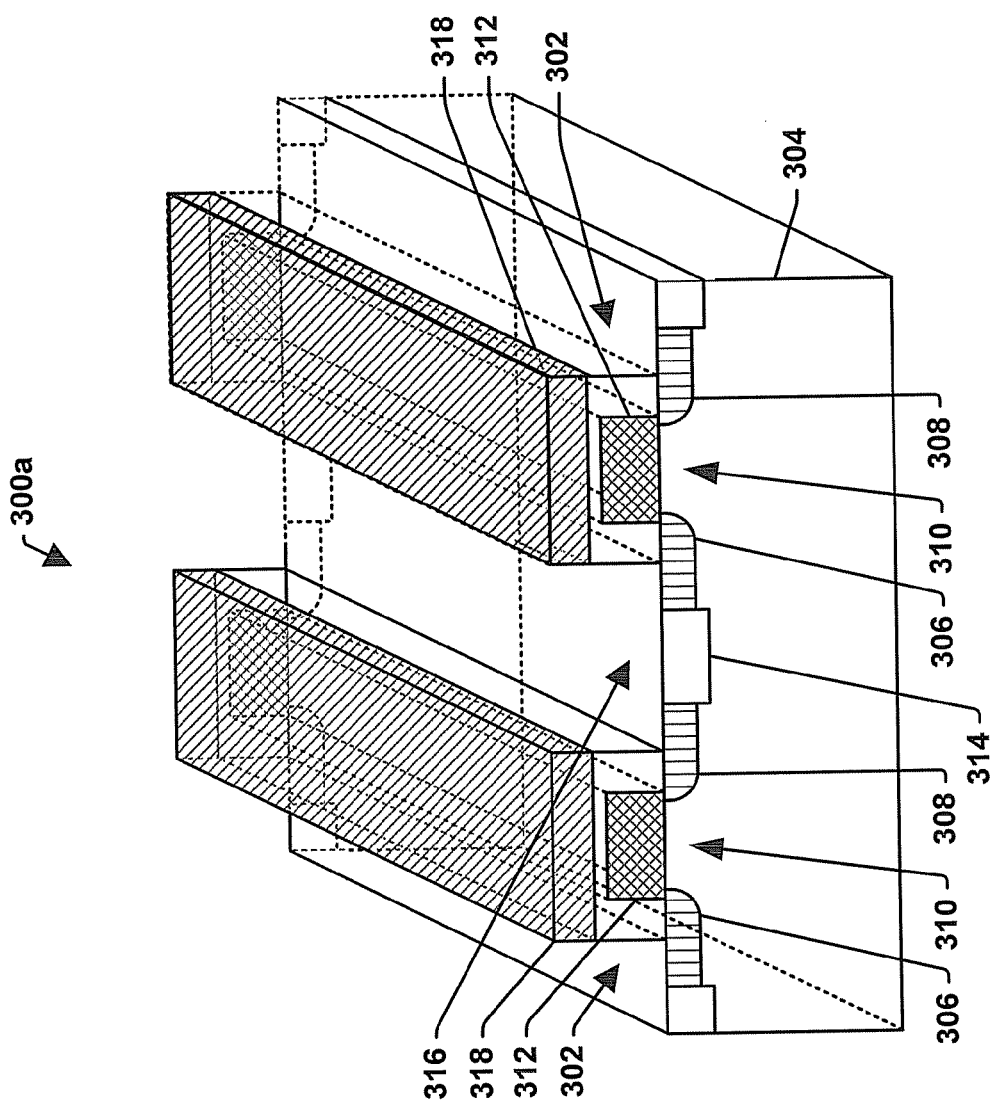
FIG. 3a is an exemplary cross-sectional isometric illustration of a memory die that is not covered with a gamma shield in accordance with one aspect of the subject innovation.
Figure 3B:
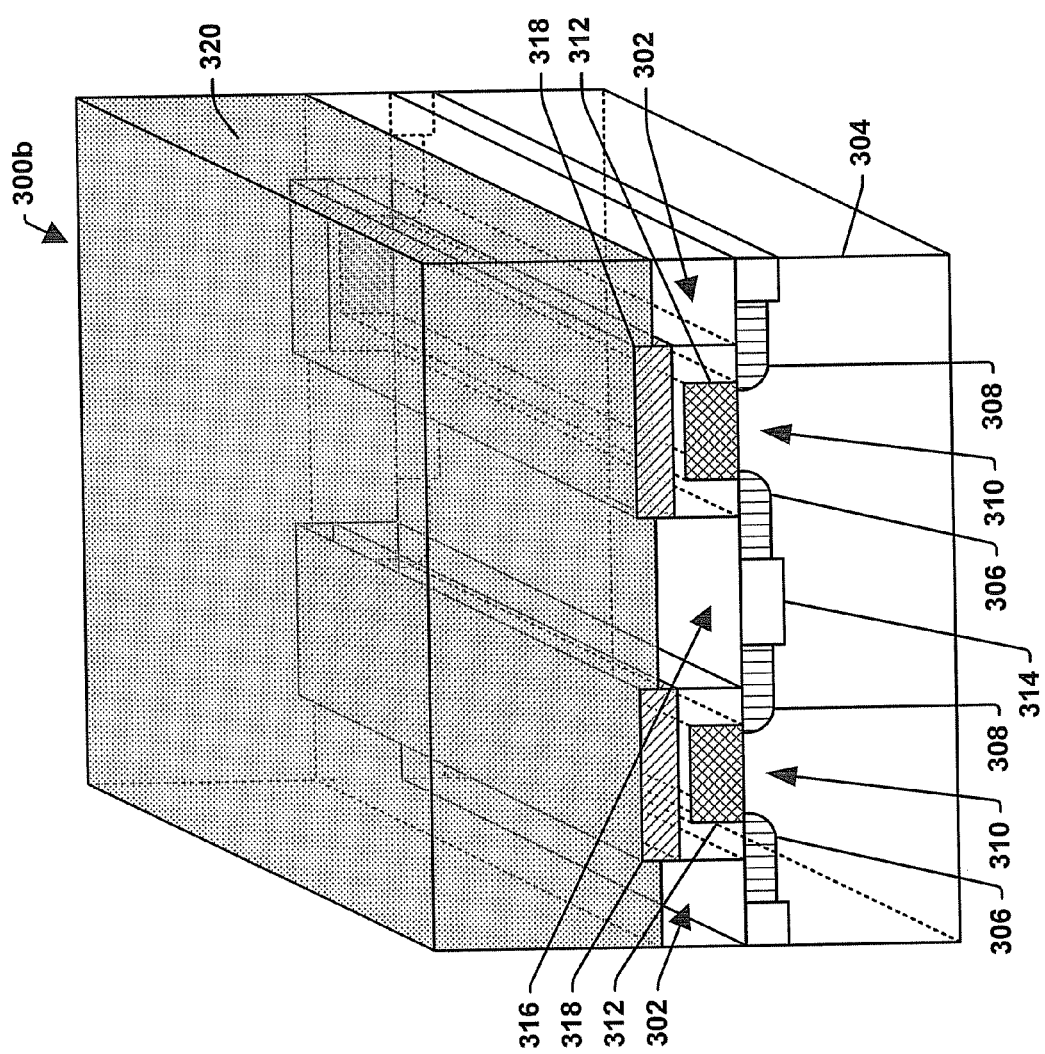
FIG. 3b is an exemplary cross-sectional isometric illustration of a memory die that is covered with a gamma shield in accordance with one aspect of the subject innovation.

FIGS. 3a and 3b are cross-sectional isometric illustrations of portions of an exemplary neutron detector as indicated in connection with FIG. 1. FIG. 3a is a cross-sectional isometric illustration of a portion 300a of a memory arrangement that is not covered with a gamma shield. FIG. 3b is a cross-sectional isometric illustration of a portion 300b of a memory arrangement that is covered with a gamma shield. The portions of the neutron detector 300a, 300b can contain memory cells 302 formed on a semiconductor substrate 304. The neutron detector 300a, 300b can contain any suitable type of memory cells as long as a state of the memory cell can be changed when particles associated with neutrons penetrate the memory cell. By way of example, FIGS. 3a and 3b illustrate portions of a neutron detector 300a, 300b including typical NAND-type flash memory cells 302. Although not shown, a neutron detector can include NOR-type flash memory cells or other flash memory cells.

The memory cells 302 typically include bit lines (e.g., a source region 306 and a drain region 308) and a channel region 310 in a substrate 304, and a stacked gate structure 312 overlying the channel region 310. The source region 306 and drain region 308 can contain an N-type of high impurity concentration and are separated by a predetermined space of a channel region 310 which can be of P-type. The substrate 302 can be an N-type substrate. The bit line 306, 308 can contain an isolation region 314 containing dielectric materials. Although not shown, a bit line opening 316 between the stacked gate structures can contain a bit line dielectric such as oxides (e.g., silicon oxide, high temperature oxide (HTO), HDP oxide).

A stacked gate structure 312 typically includes a floating gate formed by a first polysilicon (poly I) layer and a control gate formed by a second polysilicon (poly II) layer. A floating gate is isolated from a control gate by an interpoly dielectric layer and from channel region by a thin oxide layer which has a thickness of, for example, about 100 angstroms. The thin oxide layer is commonly referred to as a tunnel oxide. An interpoly dielectric layer can contain a multilayer insulator such as an oxide-nitride-oxide (ONO) stack.

The neutron detector 300a, 300b can further contain neutron-reactant layers 318 over the memory cells 312. The neutron-reactant layer 318 can contain dielectric materials and neutron-reactant materials. Any suitable neutron-reactant material can be employed in the neutron-reactant layer as long as the neutron-reactant material can react with neutrons to emit one or more particles capable of changing the state of memory cells 302. Examples of neutron-reactant materials include $^{10}$Boron, $^7$Lithium, $^{235}$Uranium, or the like. As will be discussed further below, when a neutron reacts with $^{10}$Boron, for example, a $^7$Lithium particle and a $^4$Alpha particle are emitted. Either of these particles can change the state of a memory cell 302.

Any suitable dielectric material can be employed in the neutron-reactant layer 318. General examples of dielectric materials of the neutron-reactant layer 318 include silicon based dielectric materials, oxide dielectric materials, silicates, and low k materials. Examples of silicon based dielectric materials include silicon dioxide, and silicon oxynitride. Examples of silicates include fluorine doped silicon glass (FSG), tetraethylorthosilicate (TEOS), borophosphotetraethylorthosilicate (BPTEOS), phosphosilicate glass (PSG), BPSG, and other suitable spin-on glasses. Examples of low k materials include polyimides, fluorinated polyimides, polysilsequioxane, benzocyclobutene (BCB), poly(arylene ester), parylene F, parylene N, and amorphous polytetrafluoroethylene.

In one embodiment, the neutron-reactant layer 318 contains an oxide, such as $SiO_2$, doped with a relatively high concentration of $^{10}$Boron. In another embodiment, the neutron-reactant layer 318 contains a borophosphosilicate glass (BPSG) having a relatively high concentration of $^{10}$Boron (e.g., $^{10}$BPSG). The concentration of $^{10}$Boron can be suitably selected in consideration of the desired sensitivity of the neutron detector 300 as well as in consideration of device reliability. In one embodiment, the neutron-reactant layer 318 contains about 60 wt % of $^{10}$Boron or more and about 90 wt % of $^{10}$Boron or less.

In naturally occurring Boron, typically, a concentration of $^{11}$Boron is relatively high as compared to a concentration of $^{10}$Boron isotope. For example, naturally occurring Boron typically includes 20 wt % of $^{10}$Boron isotope and 80 wt % $^{11}$Boron isotope. In the neutron-reactant layer 318, suitable concentrations of $^{10}$Boron range from about 80 wt % to about 100 wt % of the total Boron concentration. In some embodiments, concentrations of $^{10}$Boron range from about 95 wt % to about 100 wt % of the total Boron concentration.

Neutron-reactant layers 318 can be formed by any suitable technique. For example, a $^{10}$BPSG layer can be formed by BPSG deposition techniques using a source of Boron having a relatively high concentration of the $^{10}$Boron isotope. The $^{10}$BPSG layer can be formed using, for example, spin-on techniques, chemical vapor deposition (CVD) techniques. CVD includes pulsed plasma enhanced chemical vapor deposition (PECVD) and pyrolytic CVD as well as continuous PECVD. In one embodiment, a $^{10}$BPSG layer is formed by forming a phosphosilicate glass (PSG) layer over memory cells 302 and selectively implanting a relatively high concentration of $^{10}$Boron into the PSG layer. In one embodiment, a concentration of $^{10}$Boron ranging from about 80 wt % or more and about 100 wt % or less of the total Boron concentration is implanted. In another embodiment, a concentration of $^{10}$Boron ranging from about 95 wt % or more and about 100 wt % or less of the total Boron concentration is implanted. The details of the implanting techniques for selectively implanting Boron isotopes into a PSG layer can be found in, for example, U.S. Pat. No. 5,913,131, entitled "Alternative Process for BPTEOS/BPSG Layer Formation," issued Jun. 15, 1999, which is hereby incorporated by reference.

The portion 300b of the neutron detector can further contain a gamma shield (e.g., gamma discriminators) 320 over the plurality of memory cells 302. The gamma shield 320 covers the memory cells 302 to substantially prevent penetration of gamma rays into the covered portion of the memory cells but allow penetration of neutrons into the memory cells.

The gamma shield 320 can contain any suitable material as long as the material can substantially prevents penetration of gamma rays into the covered portion but allow penetration of neutrons into the memory cells 302. Examples of gamma shield materials include metals such as lead, bismuth, tungsten, steel, copper, brass, zinc, cobalt, alloys thereof, combinations thereof, or the like.

The gamma shield 320 can have any suitable thickness to facilitate detecting neutrons and discriminating against gamma rays. The thickness may vary and is not critical to the subject innovation. The thickness of the gamma shield 320 may depend on, for example, gamma energy levels involved, desirable gamma discrimination capability, desirable dimensions (e.g., thickness) of the neutron detector 300, the configuration and/or constituent of the gamma shield, the desired implementations, and/or the neutron detector 300 being fabricated. In one embodiment, when a gamma shield is a lead (Pb) layer, a thickness of the lead gamma shield is about 1 mm or more and about 1,000 mm or less. In another embodiment, a thickness of a lead gamma shield is about 2 mm or more and about 500 mm or less. In yet another embodiment, a thickness of a lead gamma shield is about 3 mm or more and about 400 mm or less.

Figure 4:
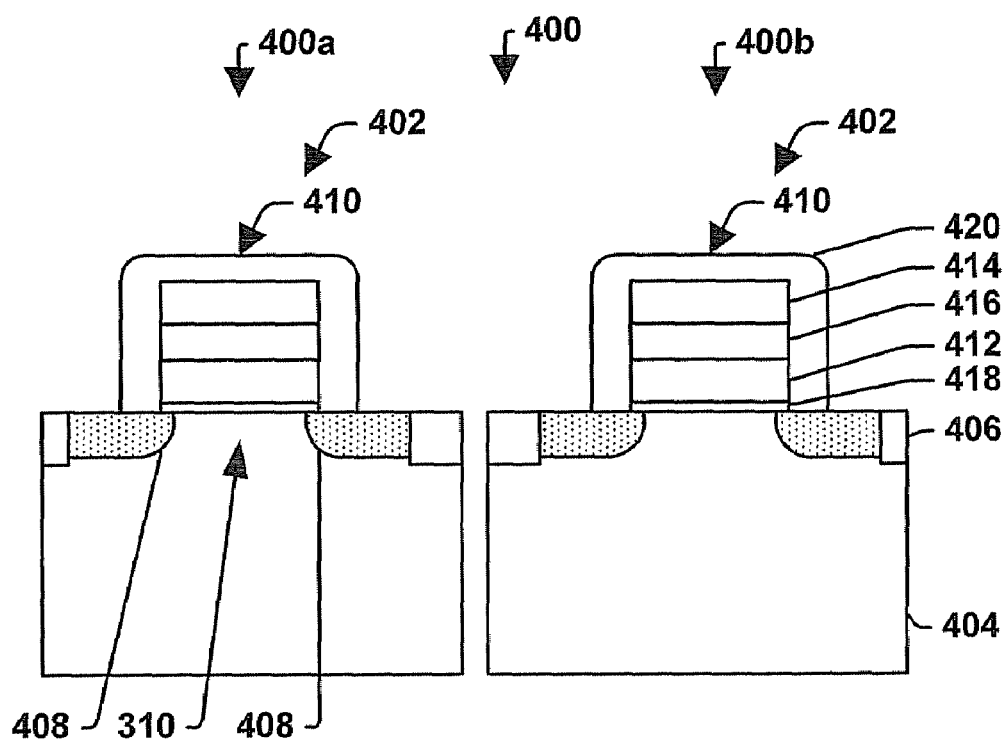
FIGS. 4-8 illustrate an exemplary method for forming a neutron detector in accordance with one aspect of the subject innovation.

Referring to FIGS. 4 to 8, one of many possible exemplary embodiments of forming a neutron detector is specifically illustrated. FIG. 4 illustrates a cross sectional view of an intermediate state of portions of memory dies of an exemplary neutron detector 400. In a portion of a memory die 400a, a gamma shield is not formed over memory cells 402. In a portion of another memory die 400b, a gamma shield is formed over memory cells 402 in subsequent processes. Although both portions 400a, 400b are illustrated in FIGS. 4 to 8, they need not be formed at the same time. In one embodiment, they are formed at the same time. In another embodiment, they are formed at different times separately.

In both portions 400a, 400b, memory cells 402 can be formed on a semiconductor substrate 404. The memory cell 402 is generally formed between isolation regions 406 on a semiconductor substrate 404 and includes source/drain regions 408 and a gate structure 410. For simplicity of illustration in FIG. 4, two memory cells 402 are shown. However, the neutron detector 400 can have any suitable number of memory cells 402 in a memory die. For example, the memory die can have a M×N array of memory cells 402 with M rows and N columns.

The semiconductor substrate 404 can contain any suitable semiconductor material on which electric devices such as memory cell transistors can be formed. Examples of semiconductor materials include silicon, gallium arsenide, indium phosphide, or the like. The isolation regions 406 can contain any suitable dielectric material such as oxides. Examples of oxides include silicon oxide, HTO, HDP oxide, or the like. In another embodiment, the isolation region 406 contains an oxide that is formed using a Slot Plane Antenna (SPA) process.

The configuration and/or constituent of the gate structure 410 may vary and are not critical to the subject innovation. The gate structure 410 may, for example, include a floating gate 412 and a select gate 414, separated by an interpoly dielectric layer 416. Examples of interpoly layers include an oxide/nitride/oxide tri-layer. The gate structure may further contain any suitable layer. For example, the gate structure contains a tunnel oxide 418 between the semiconductor substrate 404 and the floating gate 412. In another embodiment, the gate structure contains an insulating layer 420 such as an oxide layer.

Layers/components of the gate structure 410 can by formed by any suitable technique. For example, the gate structure 410 can be formed by CVD, lithography, and etching techniques. Implant regions (e.g., source/drain regions) 408 can be formed within the semiconductor substrate 404 by any suitable technique. For example, the implanted region 408 is formed via implantation of one or more dopants such as N-type dopants (e.g., arsenic, phosphorous, antimony).

Figure 5:
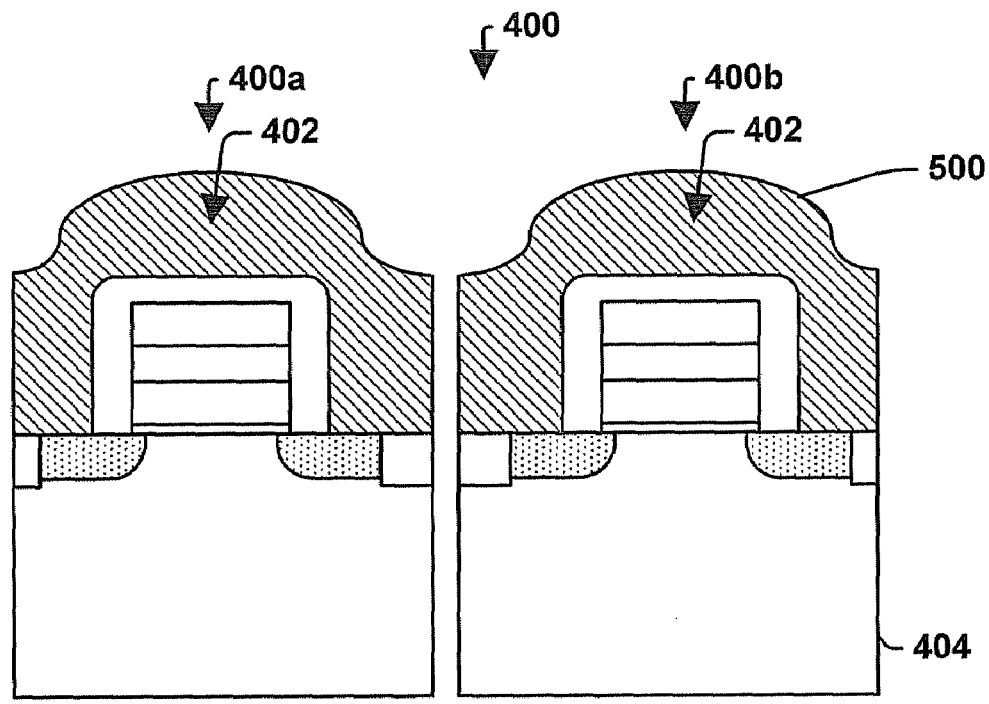

FIG. 5 illustrates forming layers of neutron-reactant material 500 over memory cells 402 in the portions 400a, 400b. The layer 500 contains any suitable neutron-reactant material that can react with a neutron and emit one or more particles capable of changing the state of a memory cell 402. For example, the layer 500 contains any of the neutron-reactant materials of the neutron-reactant layer 318 as described above in connection with FIG. 3. The layer 500 can be formed by any suitable technique. For example, the layer 500 is formed in the same manner as described for forming the neutron-reactant layer 318 in connection with FIG. 3. As shown in FIG. 5, the layer may be formed with an irregular surface. Reheating the layer can cause a reflow of the neutron-reactant material and can reduce the height of peaks and reduce the depths of valleys. Thus, an optional reheating act causing the reflow of the neutron-reactant material may be conducted.

Figure 6:
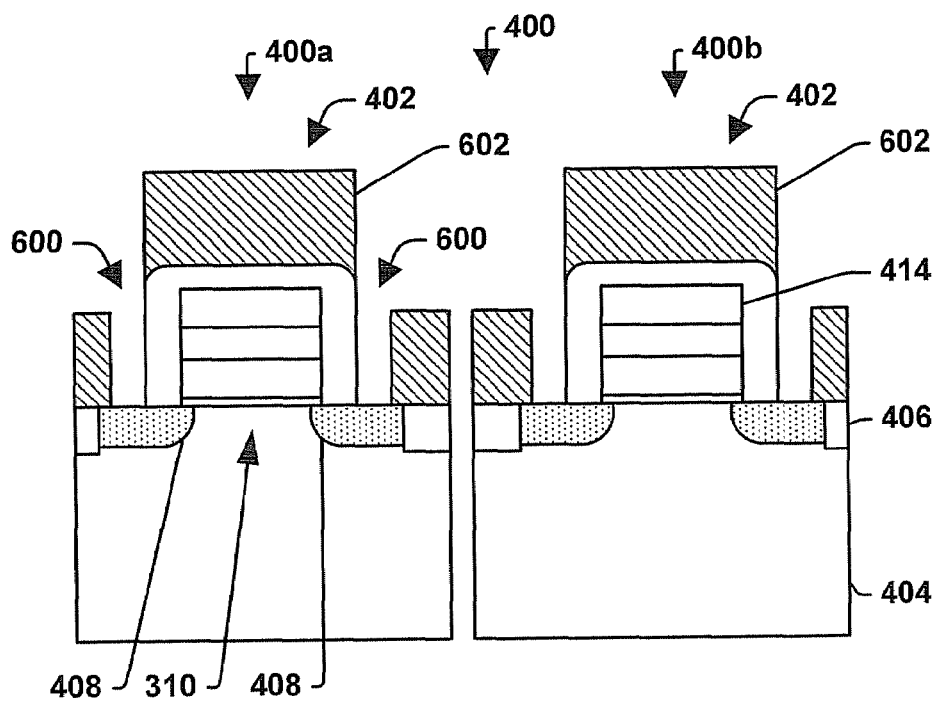

FIG. 6 illustrates removing portions of the neutron-reactant material 500, thereby forming contact openings 600 to active portions (e.g., source/drain regions 408 and select gate 414) of the memory cell 402 and forming neutron-reactant layers 602. Portions of the neutron-reactant material 500 can be removed by any suitable technique. For example, the portions are removed by chemical-mechanical polishing (CMP), lithography, and etching techniques.

The resultant neutron-reactant layers 602 can have any suitable thickness to facilitate detecting neutrons. The thickness may vary and is not critical to the subject innovation. The thickness of the neutron-reactant layers 602 may depend on, for example, on neutron energy levels involved, desirable dimensions (e.g., thickness) of the neutron detector 400, the configuration and/or constituent of the neutron-reactant layer, the desired implementations and/or the neutron detector 400 being fabricated, or the like. For example, the thickness of the neutron-reactant layer is selected to allow penetration of some of the emitted particles, such as $^4$Alpha, into the underlying memory cell 402. In one embodiment, a thickness of a neutron-reactant layer 602 is about 50 nm or more and about 1,000 nm or less. In another embodiment, a thickness of a neutron-reactant layer 602 is about 100 nm or more and about 700 nm or less. In yet another embodiment, a thickness of a neutron-reactant layer 602 is about 200 nm or more and about 500 nm or less.

Figure 7:
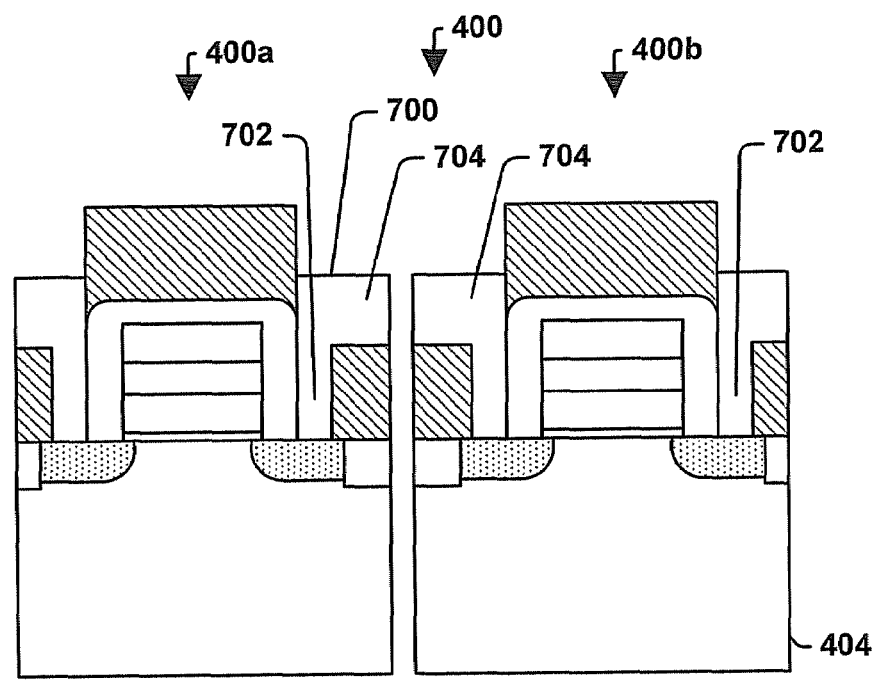

FIG. 7 illustrates forming a conductive component 700 (e.g., conductive contact 702 and conductive layer 704) over the semiconductor substrate 404. A conductive contact 702 can be formed in the contact opening 600 to electrically contact active portions of the memory cell 402. The conductive layer 702 can be formed over the substrate 404 to electrically couple the conductive contacts 702. The conductive component 700 can be formed by any suitable technique. For example, the conductive component 700 is formed by depositing a metal, such as tungsten or aluminum, via CVD, physical vapor deposition (PVD) over the semiconductor substrate 404 and removing unnecessary portions of the metal using, for example, photolithography and etching techniques.

Figure 8:
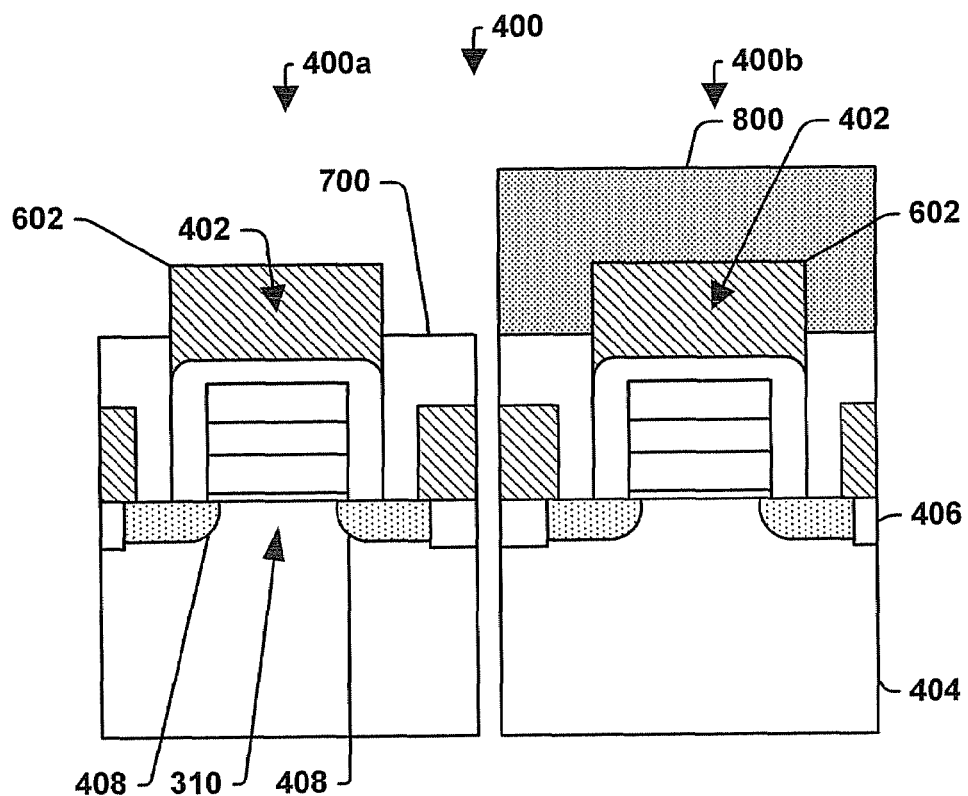

FIG. 8 illustrates forming a gamma shield 800 over memory cells 402 in the portion of a memory die 400b, thereby forming a neutron detector 400. The gamma shield 800 contains any suitable gamma shield material that can substantially prevent penetration of gamma rays into the covered portion of the memory cells 402 but allow penetration of neutrons into the memory cells 402. For example, the gamma shield 800 contains any of the materials of the gamma shield 320 as described above in connection with FIG. 3. The gamma shield 800 can be formed by any suitable technique. For example, the gamma shield 800 is formed in the same manner as described for forming the gamma shield 320 in connection with FIG. 3.

Although not shown, a passivation layer can be formed over the substrate 404 to protect and/or cover the neutron detector 400. The passivation layer can contain any suitable material such as oxides. For example, the passivation layer contains silicon dioxide. Suitable thicknesses for the passivation layer range from about 50 nm or more and about 500 nm or less.

Figure 9:
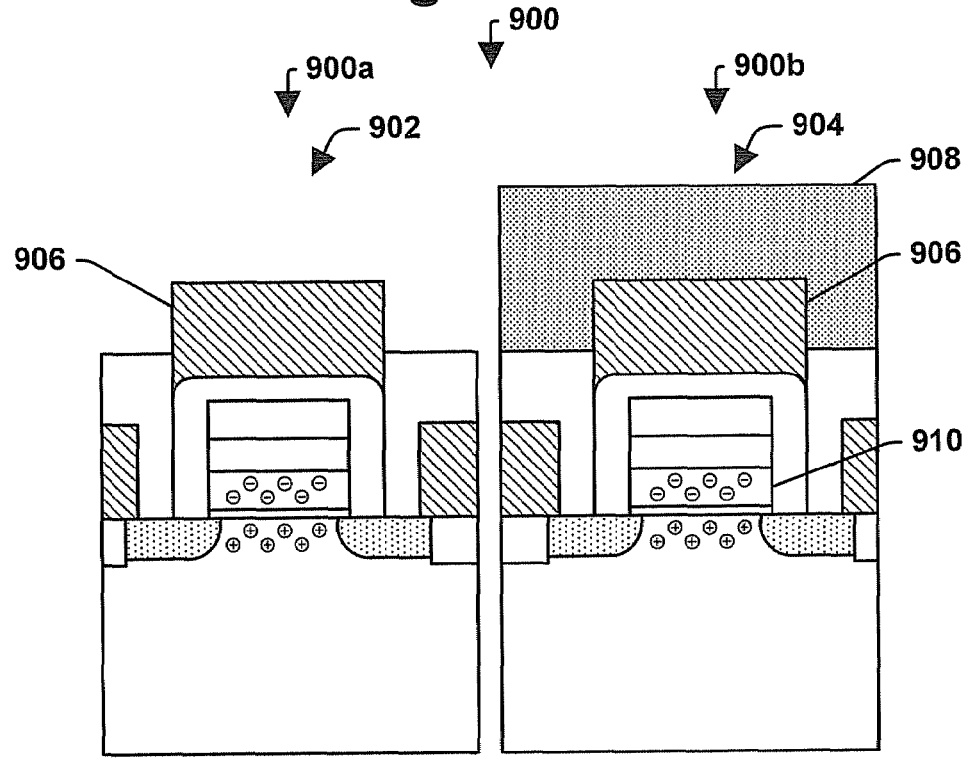
FIGS. 9-11 illustrate how the state of memory cells can change in the presence of a neutron field in accordance with one aspect of the subject innovation.
Figure 10:
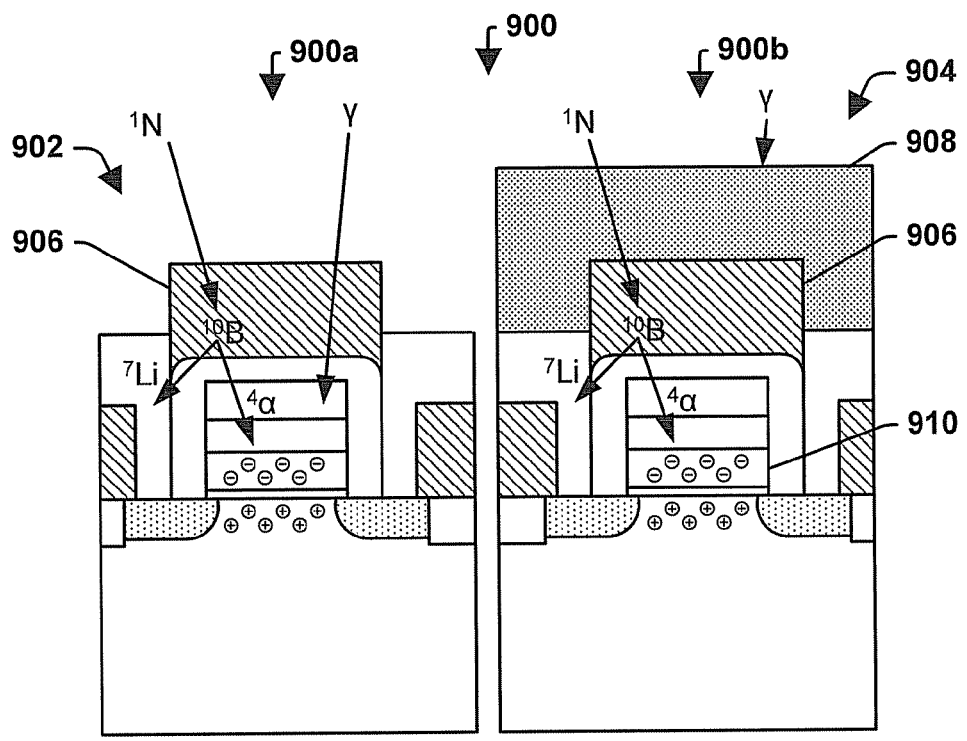
Figure 11:
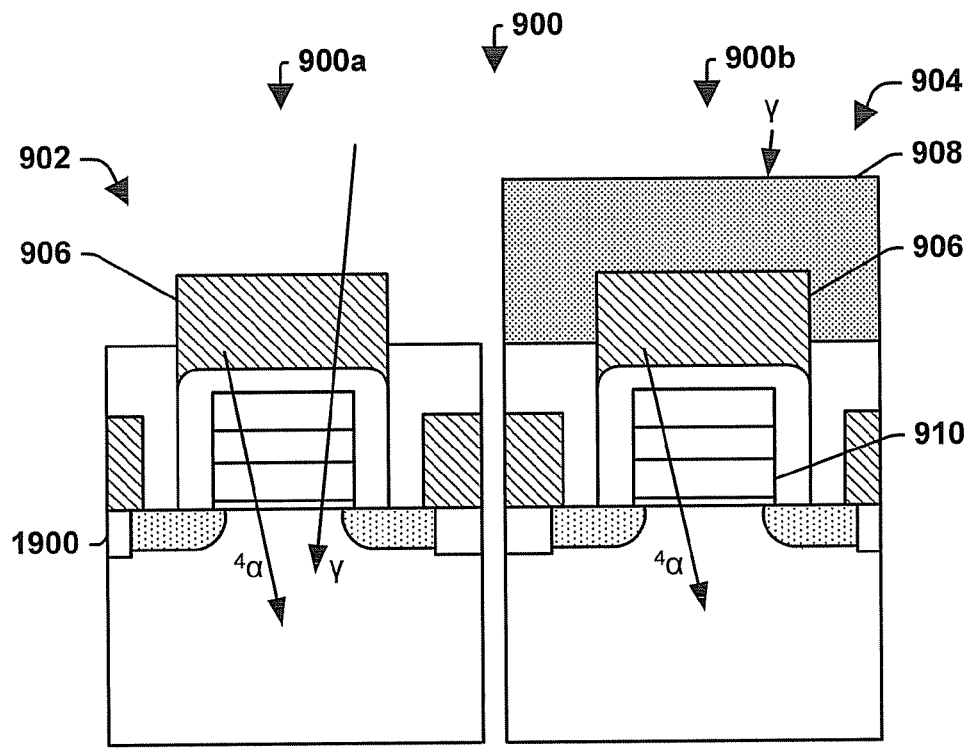

FIGS. 9 to 11 diagrammatically illustrate how the state of memory cells can change in the presence of a neutron field. Generally, neutrons are detected by determining whether or not the state of a memory cell is changed. FIG. 9 illustrates a portion of an exemplary neutron detector 900. In FIG. 9, there are illustrated two memory transistors (e.g., a left memory cell 902 and a right memory cell 904) having thereover a neutron-reactant layer 906, such as BPSG with a relatively high concentration of $^{10}$Boron. The portion of a memory die 900a of the neutron detector 900 does not include a gamma shield over the memory cell 902. The portion of another memory die 900b of the neutron detector 900 can further contain a gamma shield 908 over the memory cell 904. In this example, the initial undisturbed states of the memory cells 902, 904 are an on-state or a logical 1 state. Generally the logical 1 state is associated with a negative charge on a floating gate 910.

FIG. 10 illustrates penetration of neutrons into the two memory cells 902, 904 and penetration of gamma rays into the left memory cell 902 that is not covered with a gamma shield. Gamma rays are blocked by the gamma shield 908 and substantially prevented from penetration into the underlying memory cell 904 in the portion 900b. FIG. 10 also illustrates a reaction occurring when a neutron penetrates the neutron-reactant layer 906 and reacts with a neutron-reactant material such as a $^{10}$Boron atom in the neutron-reactant layer 906. The reaction of the neutron with the $^{10}$Boron atom generally produces a $^{7}$Lithium particle and a $^{4}$Alpha particle in accordance with the following relationship:

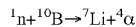

$$^{1}n + {}^{10}B \rightarrow {}^{7}Li + {}^{4}\alpha$$

FIG. 11 illustrates changing states of the memory cells 902, 904 by penetration of gamma ray and particles associated with neutrons. When the alpha particle ($^{4}$Alpha) and/or gamma ray pass through an inversion layer (e.g., tunnel layer) beneath the floating layer 910, electron holes are produced and the charge in the channel region is sufficiently reduced, thereby changing the state of the memory cells 902, 904 (e.g., from the initial undisturbed state of logical 1 to the disturbed state of logical 0). Since there is not a gamma shield over the left memory cell 902, in the portion 900a gamma rays and particles associated with neutrons can penetrate the inversion layer of the left memory cell 902 and change the status of the left memory cell 902. As a result, the left memory cell 902 can detect a neutron and gamma ray. To the contrary, since there is the gamma shield 908 over the right memory cell 904 in the portion 900b, gamma ray cannot substantially penetrate an inversion layer of the right memory cell 904. As a result, the right memory cell 904 can detect a neutron and discriminate against gamma rays.

Strength of a neutron field can be determined by reading a state of each of the memory cells to determine a number of memory cells changing from an initial state to a disturbed state and using the number of memory cells having a disturbed state. The state of each of the memory cells uncovered with the gamma shield and the state of each of the memory cells covered with the gamma shield can be read, separately. The strength of the neutron field can be determined by using a percentage of the memory cells having the disturbed state. When determining the strength of the neutron field, the disturbed percentage of the memory cells uncovered with the gamma shield can be compared with the disturbed percentage of the memory cells covered with the gamma shield.

Figure 12:
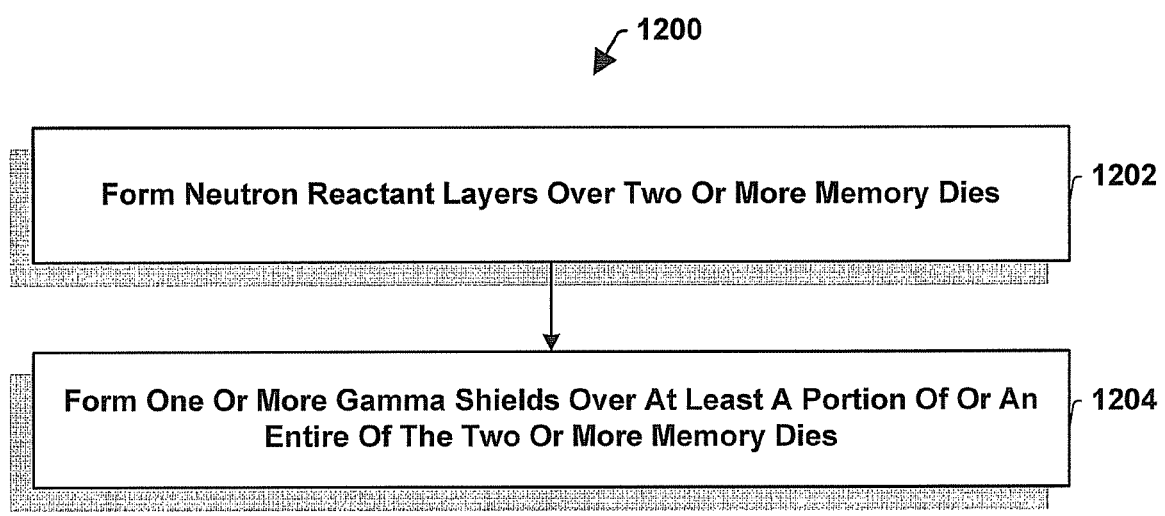
FIG. 12 illustrates an exemplary methodology of forming a neutron detector in accordance with one aspect of the subject innovation.

FIG. 12 illustrates an exemplary methodology 1200 of forming a neutron detector. At 1202, a neutron-reactant layer is formed over two or more memory dies. The memory dies can include a plurality of memory cells. At 1204, one or more gamma shields are formed over at least a portion of or an entire of the two or more memory dies. In one embodiment, the two or more memory dies contain a flash memory. In another embodiment, the neutron-reactant layer contains $^{10}$Boron. In yet another embodiment, the gamma shield contains lead. In still yet another embodiment, the gamma shield covers about 5% of memory dies or more and about 95% of memory dies or less. The methodology can further involve forming a passivation layer over the two or more memory dies.

Although not shown, the methodology of FIG. 12 may include any suitable memory die fabrication process. General examples of memory die fabrication processes include masking, patterning, etching, planarization, thermal oxidation, implant, annealing, thermal treatment, and deposition techniques normally used for making memory cells.

Figure 13:
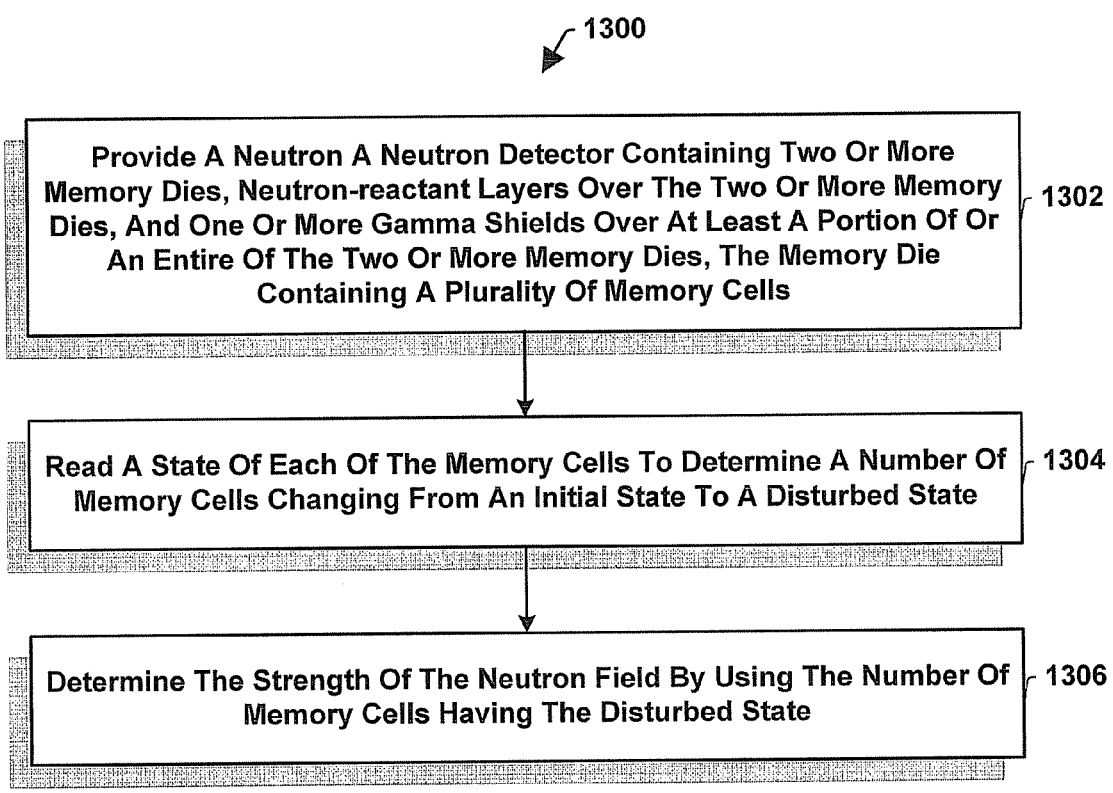
FIG. 13 illustrates an exemplary methodology of detecting strength of a neutron field in accordance with one aspect of the subject innovation.

FIG. 13 illustrates an exemplary methodology 1300 of detecting strength of a neutron field. At 1302, a neutron detector is provided. The neutron detector can include two or more memory dies, neutron-reactant layers over the two or more memory dies, and one or more gamma shields over at least a portion of or an entire of the two or more memory dies. The memory die can include a plurality of memory cells. At 1304, a state of each of the memory cells of the memory dies is read to determine a number of memory cells changing from an initial state to a disturbed state. At 1306, the strength of the neutron field is determined by using the number of memory cells having the disturbed state.

Although not shown in FIG. 13, when reading the state of each of the memory cells, the state of each of the memory cells uncovered with the gamma shield and the state of each of the memory cells covered with the gamma shield are read separately. In another embodiment, when determining the strength of the neutron field, a percentage of the memory cells having the disturbed state is determined. In yet another embodiment, when determining the strength of the neutron field, the disturbed percentage of the memory cells uncovered with the gamma shield is compared with the disturbed percentage of the memory cells covered with the gamma shield.

What has been described above includes examples of the subject innovation. It is, of course, not possible to describe every conceivable combination of components or methodologies for purposes of describing the subject innovation, but one of ordinary skill in the art may recognize that many further combinations and permutations of the subject innovation are possible. Accordingly, the subject innovation is intended to embrace all such alterations, modifications and variations that fall within the spirit and scope of the appended claims. Furthermore, to the extent that the term "includes" and "involves" are used in either the detailed description or the claims, such terms are intended to be inclusive in a manner similar to the term "comprising" as "comprising" is interpreted when employed as a transitional word in a claim.

What is claimed is:

1. A neutron detector comprising:
   two or more memory dies comprising a plurality of memory cells, the memory dies comprising neutron-reactant layers over the memory cells; and
   one or more gamma shields over at least a portion of or an entire of the two or more memory dies, the gamma shield substantially preventing gamma rays from penetrating into the memory die under the gamma shield.

2. The neutron detector of claim 1, wherein the two or more memory dies comprise a flash memory.

3. The neutron detector of claim 1, wherein the neutron-reactant layer comprises a borophosphosilicate glass that reacts with a neutron and emits a $^4$Alpha particle, and wherein the memory die uncovered with the gamma shield detects the $^4$Alpha particle and gamma rays, and the memory die covered with the gamma shield detects the $^4$Alpha particle and discriminates against gamma rays.

4. The neutron detector of claim 1, wherein the neutron-reactant layer comprises $^{10}$Boron that reacts with a neutron and emits a $^4$Alpha particle, and wherein the memory die uncovered with the gamma shield detects the $^4$Alpha particle and gamma rays, and the memory die covered with the gamma shield detects the $^4$Alpha particle and discriminates against gamma rays.

5. The neutron detector of claim 4, wherein the neutron-reactant layer comprises about 80 wt % or more and about 100 wt % or less of $^{10}$Boron in a total Boron concentration.

6. The neutron detector of claim 1, wherein the gamma shield comprises lead.

7. The neutron detector of claim 1, wherein about 5% of memory dies or more and about 95% of memory dies or less is covered with the gamma shield.

8. The neutron detector of claim 1 further comprising a passivation layer over the two or more memory dies.

9. A method of making a neutron detector, comprising:
   forming neutron-reactant layers over two or more memory dies; and
   forming one or more gamma shields over at least a portion of or an entire of the two or more memory dies, the gamma shield substantially preventing gamma rays from penetrating into the memory die under the gamma shield.

10. The method of claim 9, wherein the two or more memory dies comprise a flash memory.

11. The method of claim 9, wherein the neutron-reactant layer comprises a borophosphosilicate glass that reacts with a neutron and emits a $^4$Alpha particle, and wherein the memory die uncovered with the gamma shield detects the $^4$Alpha particle and gamma rays, and the memory die covered with the gamma shield detects the $^4$Alpha particle and discriminates against gamma rays.

12. The method of claim 9, wherein the neutron-reactant layer comprises $^{10}$Boron that reacts with a neutron and emits a $^4$Alpha particle, and wherein the memory die uncovered with the gamma shield detects the $^4$Alpha particle and gamma rays, and the memory die covered with the gamma shield detects the $^4$Alpha particle and discriminates against gamma rays.

13. The method of claim 9, wherein the neutron-reactant layer comprises about 80 wt % or more and about 100 wt % or less of $^{10}$Boron in a total Boron concentration.

14. The method of claim 9, wherein the gamma shield comprises lead.

15. The method of claim 9, wherein the gamma shield covers about 5% of memory dies or more and about 95% of memory dies or less.

16. The method of claim 9 further comprising forming a passivation layer over the two or more memory dies.

17. A method of detecting strength of a neutron field, comprising:
    providing a neutron detector comprising two or more memory dies, neutron-reactant layers over the two or more memory dies, and one or more gamma shields over at least a portion of or an entire of the two or more memory dies, the memory die comprising a plurality of memory cells, the gamma shield substantially preventing gamma rays from penetrating into the memory die under the gamma shield;
    reading a state of each of the memory cells of the memory dies to determine a number of memory cells changing from an initial state to a disturbed state; and
    determining the strength of the neutron field by using the number of memory cells having the disturbed state.

18. The method of claim 17, wherein reading the state of each of the memory cells comprises reading the state of each of the memory cells uncovered with the gamma shield and reading the state of each of the memory cells covered with the gamma shield.

19. The method of claim 17, wherein determining the strength of the neutron field comprises determining a percentage of the memory cells having the disturbed state.

20. The method of claim 17, wherein determining the strength of the neutron field comprises comparing the disturbed percentage of the memory cells uncovered with the gamma shield and the disturbed percentage of the memory cells covered with the gamma shield.

* * * * *